United States Patent [19]

Kaneko et al.

[11] Patent Number: 4,771,364
[45] Date of Patent: Sep. 13, 1988

[54] COMPOSITION FOR DIELECTRIC PORCELAIN, DIELECTRIC PORCELAIN AND CAPACITOR BY USE OF SAID COMPOSITION

[75] Inventors: Norio Kaneko, Kashiwa; Masahito Niibe, Yokohama, both of Japan

[73] Assignee: Canon Kabushiki Kaisha, Tokyo, Japan

[21] Appl. No.: 849,879

[22] Filed: Apr. 9, 1986

[30] Foreign Application Priority Data

Apr. 11, 1985 [JP] Japan ............................ 60-75283

[51] Int. Cl.$^4$ .................... H01G 4/12; C04B 35/46
[52] U.S. Cl. ................................ 361/321; 501/126; 501/134
[58] Field of Search ................. 501/726, 134; 361/321

[56] References Cited

U.S. PATENT DOCUMENTS

| | | | |
|---|---|---|---|
| 3,184,660 | 5/1965 | Robinson | 501/134 X |
| 3,553,109 | 1/1971 | Hoffman | 423/593 X |
| 3,974,107 | 8/1976 | Carcia | 252/521 X |
| 4,017,320 | 4/1977 | Fujiwara et al. | 106/73.3 |
| 4,058,404 | 11/1977 | Fujiwara et al. | 106/73.31 |
| 4,135,224 | 1/1979 | Maher | 501/134 X |
| 4,226,735 | 10/1980 | Sakabe | 252/63.2 |
| 4,654,750 | 3/1987 | Kumagai | 361/321 |
| 4,697,222 | 9/1987 | Kaneko et al. | |

FOREIGN PATENT DOCUMENTS

| | | |
|---|---|---|
| 2849293 | 5/1979 | Fed. Rep. of Germany . |
| 0058398 | 6/1974 | Japan ............. 501/134 |
| 0058399 | 6/1974 | Japan ............. 501/134 |
| 54-147461 | 11/1979 | Japan . |

Primary Examiner—Mark L. Bell
Assistant Examiner—Karl Group
Attorney, Agent, or Firm—Fitzpatrick, Cella, Harper & Scinto

[57] ABSTRACT

A composition for dielectric porcelain comprises $Bi_2O_3$, $TiO_2$ and $RuO_2$.

27 Claims, 1 Drawing Sheet

COMPOSITION FOR DIELECTRIC PORCELAIN, DIELECTRIC PORCELAIN AND CAPACITOR BY USE OF SAID COMPOSITION

BACKGROUND OF THE INVENTION

1. Field of the Invention

This invention relates to a composition for dielectric porcelain, and a dielectric porcelain and a capacitor by use of the composition.

2. Related Background Art

Heretofore, there have been employed as the dielectric member to be used for capacitors, etc. porcelains comprising $BaTiO_3$, $BaSnO_3$, $CaTiO_3$ or a solid solution having other components added to these double oxides as the main component, or these materials modified with various additives. However, these porcelains are required to be fired at a high temperature of 1300° to 1400° C. and therefore, for example, when applied for a laminated capacitor, there ensues the problem that no silver type electrode can be used as the internal electrode, and it has been sought to develop a porcelain which can be fired at lower temperatures.

Also, in the dielectric porcelain of the prior art, if the dielectric constant at around normal temperature is made greater, the temperature dependent rate of change in dielectric constant becomes also greater; on the contrary, if the temperature dependent rate of change in dielectric constant at around normal temperature is made smaller, the dielectric constant also becomes smaller. Thus, it has been difficult to obtain a porcelain with a great dielectric constant and a small temperature dependent rate of change in dielectric constant.

Further, in the case when the porcelain has high dielectric property, the Curie point becomes around normal temperature due to modification with an additive, whereby mechanical strength will be lowered due to phase transition at this temperature, and there is also involved the problem that it can be used as a functional element with difficulty.

SUMMARY OF THE INVENTION

An object of the present invention is to provide a composition for dielectric porcelain which can give a dielectric porcelain by firing at a relatively lower temperature, and a dielectric porcelain and a capacitor by use of the composition.

Another object of the present invention is to provide a composition for dielectric porcelain which can give a dielectric porcelain which is great in dielectric constant at around room temperature and yet relatively smaller in dielectric loss and temperature dependent rate of change in dielectric constant, and a dielectric porcelain and a capacitor by use of the composition.

Still another object of the present invention is to provide a composition for dielectric porcelain caspable of constituting a dielectric porcelain which is free from such a problem of lowering in mechanical strength due to phase transition at around normal temperature and can be used advantageously as a functional element, and a dielectric porcelain and a capacitor by use of the composition.

Still another object of the present invention is to provide a composition for dielectric porcelain comprising $Bi_2O_3$, $TiO_2$ and $RuO_2$.

Still another object of the present invention is to provide a dielectric porcelain prepared by use of the above composition for dielectric porcelain.

Still another object of the present invention is to provide a capacitor having a dielectric porcelain prepared by use of the above composition for dielectric porcelain and electrodes.

DESCRIPTION OF THE PREFERRED EMBODIMENTS

Figure 1:
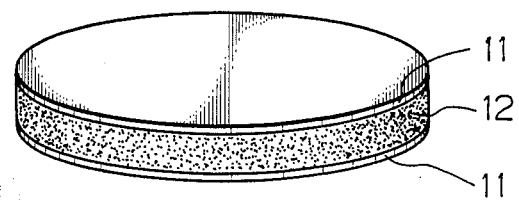
FIG. 1 is a schematic perspective view of a capacitor.

The composition for dielectric porcelain of the present invention consists of $Bi_2O_3$, $TiO_2$ and $RuO_2$, or comprises the basic components of $Bi_2O_3$, $TiO_2$ and $RuO_2$. As the mode of the composition, there may be included, for example, powdery or pressed powdery mixture of the above components, and powdery or pressed powdery mixture containing a compound oxide (including solid solution) obtained by subjecting a part or all of the above components to firing, or molded products obtained by subjecting these mixtures to the steps of the film preparation method such as CVD method or the single crystal synthetic method, etc.

Also, the dielectric porcelain of the present invention is prepared by use of the composition for dielectric porcelain as described above.

Further, the capacitor of the present invention is prepared by use of the composition for dielectric porcelain as described above.

In the present invention, the composition of particularly high utilization value as the composition for dielectric porcelain may include a composition consisting of $Bi_2O_3$, $TiO_2$ and $RuO_2$ (hereinafter referred to as composition "A"), a composition comprising $Bi_2O_3$, $TiO_2$ and $RuO_2$ as the basic components and further containing at least one of the respective oxides of Ce, La, Pr, Sm, Sc, Yb, Ho, Tb, Er, Pb, Zr and Hf, for example, a composition consisting of the above three components of $Bi_2O_3$, $TiO_2$ and $RuO_2$ in which a part of $Bi_2O_3$ is substituted with at least one of respective oxides of Ce, La, Pr, Sm, Sc, Yb, Ho, Tb and Er [the term "substituted" means that, in the case of, for example, the above powdery or pressed powdery mixture, the substituting oxide is used in place of $Bi_2O_3$, $TiO_2$ or $RuO_2$ which are components to be substituted, or in the case of the above dielectric porcelain, it is used as the solid solution component (substituent component) for $Bi_2O_3$, $TiO_2$ or $RuO_2$ which are components to be substituted, or used in place of the components to be substituted as the component of a compound comprising two or more kinds of the components to be substituted] (hereinafter referred to as composition "B"), a composition consisting of the above three components in which a part of $TiO_2$ and/or a part of $RuO_2$ are substituted with at least one of respective oxides of Pb, Zr, Tb and Hf (hereinafter referred to as composition "C"), and a composition consisting of the above three components, in which a part of $Bi_2O_3$ is substituted with at least one of respective oxides Ce, La, Pr, Sm, Sc, Yb, Ho, Tb and Er, and a part of $TiO_2$ and/or a part of $RuO_2$ are substituted with at least one of respective oxides of Pb, Zr, Tb and Hf (hereinafter referred to as composition "D").

In the above composition, in the case where the compound to be substituted is $Bi_2O_3$, the ratio of substitution should preferably be 37 mole % or less of the compound to be substituted, while in the case where the compound to be substituted is $TiO_2$ or $RuO_2$, it should preferably be 30 mole % or less of the compound to be substituted.

Further, a more preferable compositional ratio of the above composition A comprises 25.0 mole % to 43.0 mole % of $Bi_2O_3$, 37.0 mole % to 66.0 mole % of $TiO_2$ and 5.0 mole % to 20.0 mole % of $RuO_2$.

Also, in the composition B, the composition C and the composition D, more preferable compositions are those in which the ratios of the number of moles of $Bi_2O_3$ added with the number of moles of the substituting oxides, the number of moles of $TiO_2$ added with the number of moles of the substituting oxides and the number of moles of $RuO_2$ added with the number of moles of the substituting oxides, when adding the number of moles of the substituting oxides to the number of moles of $Bi_2O_3$, $TiO_2$ and $RuO_2$ which are components to be substituted, are 25.0 mole % to 43.0 mole %, 37.0 mole % to 66.0 mole % and 5.0 mole % to 20.0 mole %, respectively, relative to the sum of these numbers of moles.

In the above compositions A, B, C and D, the ratios of the number of moles of $Bi_2O_3$ or the number of moles of $Bi_2O_3$ added with the number of moles of the substituting oxides, number of the moles of $TiO_2$ added with the number of moles of the substituting oxides and the number of moles of $RuO_2$ or the number of moles of $RuO_2$ added with the number of moles of the substituting oxides are particularly preferred within the numerical ranges as specified above, respectively, for the following reasons.

If the number of moles of $Bi_2O_3$ or the number of moles of $Bi_2O_3$ added with the number of moles of the substituting oxides are less than 25.0 mole %, sintering characteristics become worsened to be lowered in mechanical strength as the firing temperature is elevated.

If the number of moles of $Bi_2O_3$ or the number of moles of $Bi_2O_3$ added with the number of moles of the substituting oxides exceed 43.0 mole %, dielectric constant will be lowered.

If the number of moles of $TiO_2$ or the number of moles of $TiO_2$ added with the number of moles of the substituting oxides are less than 37.0 mole %, dielectric constant will be lowered and the temperature dependent rate of change in dielectric constant becomes greater.

If the number of moles of $TiO_2$ or the number of moles of $TiO_2$ added with the number of moles of the substituting oxides exceed 66.0 mole %, the firing temperature is elevated and also sintering characteristics becomes worsened.

If the number of moles of $RuO_2$ or the number of moles of $RuO_2$ added with the number of moles of the substituting oxides are less than 5.0 mole %, dielectric constant will be lowered.

If the number of moles of $RuO_2$ or the number of moles of $RuO_2$ added with the number of moles of the substituting oxides exceed 20.0 mole %, dielectric strength will be lowered.

The ratio of the number of moles of the substituting oxides for $BiO_2O_3$ and the ratio of the number of moles of the substituting oxides for $TiO_2$ and/or $RuO_2$ are preferably within the numerical ranges as specified above for the following reasons.

If the ratio of the moles of the substituting oxides for $Bi_2O_3$ exceed 37 mole %, the firing temperature will be elevated, while if the ratio of the moles of the substituting oxides for $TiO_2$ and/or $RuO_2$ exceed 30 mole %, dielectric constant will be lowered.

The dielectric porcelain and the capacitor in the present invention are prepared by use of the composition for dielectric porcelain as described above.

[Examples]

The respective starting materials were weighed and mixed in a wet system so that the dielectric porcelains with the compositional ratios shown in Table 1 could be obtained. After drying of the mixture, the reaction temperature was determined according to the differential thermal analysis. After the above mixture was sintered at the temperature higher by 50° C. than the reaction temperature for 2 hours, it was groun in a wet system in a ball mill. The ground product was mixed with polyvinyl alcohol as the binder, pressure molded into discs of 11 mm in diameter and 5 mm in thickness, which were further sintered at the firing temperature indicated in Table 1 higher by 100° C. than the prefiring temperature for 5 hours. The sintered products were attached with silver as electrodes on both surfaces by the vacuum vapor deposition method to form capacitors as shown in FIG. 1, and the electrical characteristics of respective capacitors were measured. FIG. 1 shows a schematic perspective view of a capacitor, in which 11 show electrodes and 12 is a dielectric porcelain sample. First, dielectric constant and dielectric loss (tan δ) of the dielectric porcelain samples were measured at a frequency of 1 MHz and 25° C.

Also, the temperature dependent rate of change in dielectric constant at 50° C., 80° C. at a frequency of 1 MHz was also measured for each sample with the value at 25° C. as the standard. The results are shown in Table 1.

TABLE 1

| Sample No. | Composition (mole %) | | | | Firing Temperature (°C.) | Dielectric Constant (1MHz, 25° C.) | Dielectric Loss (tan δ) (%) | Temperature dependent rate of change in dielectric constant (%) | |
|---|---|---|---|---|---|---|---|---|---|
| | $Bi_2O_3$ | $TiO_2$ | $RuO_2$ | Metal Oxide (M = metal) | | | | 50° C. | 80° C. |
| 1* | 34.0 | 66.0 | — | — | 1200 | 23 | 2.3 | +12.5 | +25.1 |
| 2* | 40.0 | 60.0 | — | — | 1250 | 18 | 1.9 | +2.9 | +6.0 |
| 3 | 42.6 | 50.3 | 7.1 | — | 1000 | 58 | 0.98 | −0.6 | −1.2 |
| 4 | 42.0 | 38.0 | 20.0 | — | 1040 | 116 | 1.1 | −0.5 | −1.1 |
| 5 | 35.0 | 55.0 | 5.5 | M = Zr 4.5 | 1090 | 46 | 0.56 | +0.3 | +0.7 |
| 6 | 40.6 | 48.0 | 6.0 | M = Hf 5.4 | 1100 | 42 | 0.62 | +0.1 | +0.2 |
| 7 | 30.0 | 60.0 | 6.5 | M = Pr 3.5 | 1140 | 34 | 0.49 | −0.3 | −0.6 |
| 8 | 29.8 | 59.6 | 5.0 | M = Ce | 1090 | 39 | 0.78 | −0.2 | −0.5 |

TABLE 1-continued

| Sample No. | Composition (mole %) | | | | Firing Temperature (°C.) | Dielectric Constant (1MHz, 25° C.) | Dielectric Loss (tan δ) (%) | Temperature dependent rate of change in dielectric constant (%) | |
| --- | --- | --- | --- | --- | --- | --- | --- | --- | --- |
| | $Bi_2O_3$ | $TiO_2$ | $RuO_2$ | Metal Oxide (M = metal) | | | | 50° C. | 80° C. |
| 9 | 33.6 | 54.0 | 6.0 | 5.6 M = Pb | 990 | 40 | 0.43 | +0.2 | +0.5 |
| 10 | 30.0 | 53.5 | 6.5 | 6.4 M = Pr | 1050 | 55 | 1.0 | +0.1 | +0.2 |
| 11 | 25.3 | 49.7 | 10.3 | 10.0 M = Ce | 1040 | 74 | 1.2 | +0.2 | +0.4 |
| 12 | 27.7 | 65.0 | 5.0 | 14.7 M = La | 1090 | 90 | 1.0 | +0.1 | +0.3 |
| 13 | 30.9 | 52.5 | 7.0 | 2.3 M = Sm | 1140 | 82 | 0.88 | −0.1 | −0.2 |
| 14 | 35.8 | 55.0 | 5.0 | 9.6 M = Yb | 1100 | 93 | 1.2 | −0.4 | −0.9 |
| 15 | 30.6 | 58.5 | 5.9 | 4.2 M = Er | 1140 | 115 | 0.73 | −0.2 | −0.4 |
| 16 | 30.0 | 58.0 | 5.8 | 5.0 M = La | 1090 | 130 | 0.93 | +0.5 | +1.3 |
| 17 | 26.0 | 61.0 | 5.0 | 6.2 M = Sc | 1140 | 126 | 0.82 | −0.2 | −0.3 |
| 18 | 25.0 | 59.5 | 15.5 | 8.0 — | 1100 | 110 | 0.89 | −0.5 | −1.2 |
| 19 | 43.0 | 52.0 | 5.0 | — | 1000 | 83 | 0.90 | −0.2 | −0.3 |
| 20 | 43.0 | 37.0 | 20.0 | — | 1130 | 36 | 1.2 | −0.1 | −0.2 |
| 21 | 29.0 | 66.0 | 5.0 | — | 1050 | 96 | 0.97 | +0.1 | +0.2 |

(NOTE)
Not included in the present invention

As is apparent from Table 1, the samples No. 3 to No. 21 which are dielectric porcelains according to the present invention can be varied largely in dielectric constant in practical range depending on the composition, and the firing temperature was also lower as compared with the porcelains of the prior art. Also, it was found that the dielectric loss characteristic (tan δ) could be improved, with the temperature dependent rate of change of dielectric constant being small.

As can be clearly seen from the above detailed description, particularly Examples, according to the composition for dielectric porcelain of the present invention, dielectric porcelains can be obtained by firing at a relatively lower temperature. Therefore, for example, when applied for a laminated ceramic capacitor, silver type electrodes can be used as the internal electrode, which can contribute much to lowering of cost. Besides, since the dielectric constant at around normal temperature at which dielectric members are used is great, it can contribute to minituarization of capacitors to be of great utilization value in industry. At the same time, due to small temperature dependent rate of change in dielectric constant at around normal temperature, stable performance can be exhibited with high reliability, and yet there is no problem of lowering in mechanical strength due to phase transition at around normal temperature, and therefore it can be utilized effectively as a functional element.

What is claimed is:

1. An unfired composition for producing a dielectric porcelain having a dielectric constant of 34 to 130 at a frequency of 1 MHz and a temperature of 25° C. consisting essentially of 25.0 to 43.0 mole % $Bi_2O_3$, 37.0 to 66.0 mole % $TiO_2$, and 5.0 to 20.0 mole % $RuO_2$.

2. An unfired composition for producing a dielectric porcelain according to claim 1, further consisting essentially of an oxide selected from the group consisting of Ce, La, Pr, Sm, Sc, Yb, Ho, Tb and Er.

3. An unfired composition for producing a dielectric porcelain according to claim 2, wherein the content of the oxide is 37 mole % or less based on the sum of the number of moles of oxide and the number of moles of $Bi_2O_3$.

4. An unfired composition for producing a dielectric porcelain according to claim 2, wherein the sum of the number of moles of $Bi_2O_3$ and the number of moles of the oxide is 25.0 to 43.0 mole %, the number of moles of $TiO_2$ is 37.0 to 66.0%, and the number of moles of $RuO_2$ is 5.0 to 20.0 mole %, based on the total number of moles.

5. An unfired composition for producing a dielectric porcelain according to claim 1, further consisting essentially of an oxide selected from the group consisting of Pb, Zr, Tb and Hf.

6. An unfired composition for producing a dielectric porcelain according to claim 5, wherein the content of the oxide is 30 mole % or less based on the sum of the number of moles of the oxide and the number of moles of $TiO_2$.

7. An unfired composition for producing a dielectric porcelain according to claim 5, wherein the number of moles of $Bi_2O_3$ is 25.0 to 43.0 mole %, the sum of the number of moles of $TiO_2$ and the number of moles of the oxide is 37.0 to 66.0 mole %, and the number of moles of $RuO_2$ is 5.0 to 20.0 mole %, based on the total number of moles.

8. An unfired composition for producing a dielectric porcelain according to claim 6, wherein the content of the oxide is 30 mole % or less based on the sum of the number of moles of the oxide and the number of moles of $RuO_2$.

9. An unfired composition for producing a dielectric porcelain according to claim 5, wherein the number of moles of $Bi_2O_3$ is 25.0 to 43.0 mole %, the number of moles of $TiO_2$ is 37.0 to 66.0 mole %, and the sum of the number of moles of $RuO_2$ and the number of the oxide is 5.0 to 20.0 mole %, based on the total number of moles.

10. A dielectric porcelain consisting essentially of 25.0 to 43.0 mole % $Bi_2O_3$, 37.0 to 66.0 mole % $TiO_2$, and 5.0 to 20.0 mole % $RuO_2$; and having a dielectric constant of 34 to 130 at a frequency of 1 $MH_z$ and a temperature of 25° C.

11. A dielectric porcelain according to claim 10, further consisting essentially of an oxide selected from the group consisting of Ce, La, Pr, Sm, Sc, Yb, Ho, Tb and Er.

12. A dielectric porcelain according to claim 11, wherein the content of the oxide is 37 mole % or less based on the sum of the number of moles of the oxide and the number of moles of $Bi_2O_3$.

13. A dielectric porcelain according to claim 11, wherein the sum of the number of moles of $Bi_2O_3$ and the number of moles of the oxide is 25.0 to 43.0 mole %, the number of moles of $TiO_2$ is 37.0 to 66.0%, and the number of moles of $RuO_2$ is 5.0 to 20.0 mole %, based on the total number of moles.

14. A dielectric porcelain according to claim 10, further consisting essentially of an oxide selected from the group consisting of pb, Zr, Tb and Hf.

15. A dielectric porcelain according to claim 14, wherein the content of the oxide is 30 mole % or less based on the sum of the number of moles of the oxide and the number of moles of $TiO_2$.

16. A dielectric porcelain according to claim 14, wherein the number of moles of $Bi_2O_3$ is 25.0 to 43.0 mole %, the sum of the number of moles of $TiO_2$ and the number of moles of the oxide is 37.0 to 66.0 mole %, and the number of moles of $RuO_2$ is 5.0 to 20.0 mole %, based on the total number of moles.

17. A dielectric porcelain according to claim 14, wherein the content of the oxide is 30 mole % or less based on the sum of the number of moles of the selected oxide and the number of moles of $RuO_2$.

18. A dielectric porcelain according to claim 14, wherein the number of moles of $Bi_2O_3$ is 25.0 to 43.0 mole the number of moles of $TiO_2$ is 37.0 to 66.0 mole %, and the sum of the number of moles of $RuO_2$ and the number of moles of the oxide is 5.0 to 20.0 mole %, based on the total number of moles.

19. A capacitor comprising a dielectric porcelain, a first electrode on a first surface of said dielectric porcelain, and a second electrode on a second surface of said dielectric porcelain opposite said first surface; said dielectric porcelain consisting essentially of 25.0 to 43.0 mole % $Bi_2O_3$, 37.0 to 66.0 mole % $TiO_2$, and 5.0 to 20.0 mole % $RuO_2$; and having a dielectric constant of 34 to 130 at a frequency of 1 $MH_z$ and a temperature of 25° C.

20. A capacitor according to claim 19, wherein said dielectric porcelain further consists essentially of an oxide selected from the group consisting of Ce, La, Pr, Sm, Sc, Yb, Ho, Tb and Er.

21. A capacitor according to claim 20, wherein the content of the oxide is 37 mole % or less based on the sum of the number of moles of the oxide and the number of moles of $Bi_2O_3$.

22. A capacitor according to claim 20, wherein the sum of the number of moles of $Bi_2O_3$ and the number of moles of the oxide is 25.0 to 43.0 mole %, the number of moles of $TiO_2$ is 37.0 to 66.0%, and the number of moles of $RuO_2$ is 5.0 to 20.0 mole %, based on the total number of moles.

23. A capacitor according to claim 19, wherein said dielectric porcelain further consists essentially of an oxide selected from the group consisting of Pb, Zr, Tb and Hf.

24. A capacitor according to claim 23, wherein the content of the oxide is 30 mole % or less based on the sum of the number of moles of the oxide and the number of moles of $TiO_2$.

25. A capacitor according to claim 23, wherein the number of moles of $Bi_2O_3$ is 25.0 to 43.0 mole %, the sum of the number of moles of $TiO_2$ and the number of moles of the oxide is 37.0 to 66.0 mole %, and the number of moles of $RuO_2$ is 5.0 to 20.0 mole %, based on the total number of moles.

26. A capacitor according to claim 23, wherein the content of oxide is 30 mole % or less based on the sum of the number of moles of the selected oxide and the number of moles of $RuO_2$.

27. A capacitor according to claim 23, wherein the number of moles of $Bi_2O_3$ is 25.0 to 43.0 mole %, the number of moles of $TiO_2$ is 37.0 to 66.0 mole %, and the sum of the number of moles of $RuO_2$ and the number of moles of the oxide is 5.0 to 20.0 mole %, based on the total number of moles.

* * * * *

UNITED STATES PATENT AND TRADEMARK OFFICE
CERTIFICATE OF CORRECTION

PATENT NO. : 4,771,364
DATED : September 13, 1988
INVENTOR(S) : NORIO KANEKO, ET AL.

It is certified that error appears in the above-identified patent and that said Letters Patent is hereby corrected as shown below:

COLUMN 4

Line 10, "$BiO_2O_3$" should read --$Bi_2O_3$--.
Line 31, "groun" should read --ground--.

COLUMN 5

Line 50, "minituarization" should read --miniaturization--.

COLUMN 6

Line 34, "of oxide" should read --of the oxide--.
Line 60, "claim 6," should read --claim 5,--.

COLUMN 7

Line 24, "pb," should read --Pb,--.
Line 41, "mole the" should read --mole %, the--.

Signed and Sealed this

Fourth Day of April, 1989

Attest:

DONALD J. QUIGG

*Attesting Officer*　　　　*Commissioner of Patents and Trademarks*